United States Patent
Kawamoto et al.

(10) Patent No.: US 10,063,120 B2
(45) Date of Patent: Aug. 28, 2018

(54) MOTOR AND IN-VEHICLE APPARATUS

(71) Applicant: NIDEC CORPORATION, Minami-ku, Kyoto (JP)

(72) Inventors: Tatsuro Kawamoto, Kyoto (JP); Takayuki Migita, Kyoto (JP); Takao Atarashi, Kyoto (JP); Masateru Kawakami, Kyoto (JP); Takahiro Kizu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 336 days.

(21) Appl. No.: 15/085,297

(22) Filed: Mar. 30, 2016

(65) Prior Publication Data
US 2016/0294240 A1    Oct. 6, 2016

(30) Foreign Application Priority Data

Mar. 30, 2015 (JP) ................. 2015-069814

(51) Int. Cl.
| | |
|---|---|
| H02K 3/28 | (2006.01) |
| H02K 3/32 | (2006.01) |
| H02K 3/38 | (2006.01) |
| H02K 3/52 | (2006.01) |
| H02K 5/22 | (2006.01) |

(52) U.S. Cl.
CPC ............ H02K 3/325 (2013.01); H02K 3/38 (2013.01); H02K 3/522 (2013.01); H02K 5/225 (2013.01)

(58) Field of Classification Search
CPC .. H02K 3/28; H02K 3/46; H02K 5/16; H02K 3/325; H02K 3/38; H02K 3/522; H02K 5/225

USPC ............................................ 310/90, 91, 71
See application file for complete search history.

(56) References Cited

U.S. PATENT DOCUMENTS

| | | | |
|---|---|---|---|
| 6,121,702 A | 9/2000 | Tischer et al. | |
| 8,384,257 B2 | 2/2013 | Kinugawa et al. | |
| 2008/0136274 A1 | 6/2008 | Fujii et al. | |
| 2008/0181547 A1* | 7/2008 | Chen ................. | F16C 35/02 |
| | | | 384/428 |
| 2010/0133935 A1* | 6/2010 | Kinugawa ............... | H02K 3/50 |
| | | | 310/89 |
| 2010/0187923 A1 | 7/2010 | Migita et al. | |

(Continued)

FOREIGN PATENT DOCUMENTS

| | | |
|---|---|---|
| JP | 4902738 B2 | 3/2012 |
| JP | 2012223030 A | 11/2012 |
| JP | 2014138499 A | 7/2014 |

*Primary Examiner* — Naishadh Desai
(74) *Attorney, Agent, or Firm* — Cantor Colburn LLP

(57) ABSTRACT

A motor may include a rotor including a shaft having a central axis; a stator opposite to the rotor, and comprising coils; a bearing supporting the shaft; a metallic bearing holder covering the stator and supporting the bearing; at least one busbar on an opposite axial side of the bearing holder and including a connection terminal connected with a a coil wire extending from one of the coils; and a coil support between the stator and the bearing holder and fixed to the stator. The bearing holder may include at least one through hole. The coil support may include at least one insulating support portion comprising an opening portion. A portion of the opening portion of the insulating support portion having a smallest cross-sectional area in the opening portion lies inside of an edge of one of the through holes of the bearing holder.

16 Claims, 13 Drawing Sheets

(56) References Cited

U.S. PATENT DOCUMENTS

2011/0006625 A1     1/2011   Fujii et al.
2016/0333833 A1*   11/2016   Honda ................... F02M 37/10

* cited by examiner

MOTOR AND IN-VEHICLE APPARATUS

CROSS REFERENCE TO RELATED APPLICATION

The present application claims priority under 35 U.S.C. § 119 to Japanese Application No. 2015-069814 filed Mar. 30, 2015, the entire content of which is incorporated herein by reference.

FIELD OF THE INVENTION

At least an embodiment of the present invention relates to a motor and an in-vehicle apparatus.

BACKGROUND

Inner-rotor brushless motors have been known. Such a known motor includes, for example, a bearing, an insulating plate arranged to hold the bearing, and busbars arranged radially outward of the insulating plate. End portions of windings of coils of this motor are passed through through holes defined in the insulating plate, and are connected to terminals of the busbars. The end portions of the windings are positioned by the through holes, and are thus easily connected to the terminals of the busbars.

In a motor for use in a vehicle, which receives strong vibrations, a member arranged to hold a bearing is preferably made of a metallic material having a high rigidity. However, in the case where the member arranged to hold the bearing is made of a metallic material, it may be difficult to provide isolation between coil ends and the member arranged to hold the bearing.

SUMMARY

In view of the above, at least an embodiment of the present invention has been conceived to provide a motor which is configured to prevent the coil ends from undergoing a short circuit and to facilitate positioning of the coil ends.

A motor according to at least an embodiment of the present invention includes a rotor including a shaft having a central axis extending in an axial direction as a center thereof; a stator arranged opposite to the rotor, and including a plurality of coils; a bearing arranged to support the shaft; a metallic bearing holder arranged to cover the stator from an axial side thereof, and arranged to support the bearing; at least one busbar arranged on an opposite axial side of the bearing holder with respect to the stator, and including a connection terminal connected with a coil end of a coil wire extending from a corresponding one of the coils; and a coil support arranged between the stator and the bearing holder, and fixed to the stator. The bearing holder includes at least one through hole arranged to pass therethrough in the axial direction to have a corresponding one of the coil ends pass therethrough. The coil support includes at least one insulating support portion including an opening portion arranged to pass therethrough in the axial direction to have a corresponding one of the coil ends pass therethrough. A portion of the opening portion of the at least one insulating support portion which has a smallest cross-sectional area in the opening portion lies inside of an edge of a corresponding one of the at least one through hole of the bearing holder when viewed in the axial direction.

A motor according to another embodiment of the present invention includes a rotor including a shaft having a central axis extending in an axial direction as a center thereof; a stator arranged opposite to the rotor, and including a plurality of coils; a bearing arranged to support the shaft; a metallic bearing holder arranged to cover the stator from an axial side thereof, and arranged to support the bearing; at least one busbar arranged on an opposite axial side of the bearing holder with respect to the stator, and including a connection terminal connected with a coil end of a coil wire extending from a corresponding one of the coils; and a busbar holder arranged to support the at least one busbar. The bearing holder includes at least one through hole arranged to pass therethrough in the axial direction to have a corresponding one of the coil ends pass therethrough. The busbar holder includes at least one insulating support portion including an opening portion arranged to pass therethrough in the axial direction to have a corresponding one of the coil ends pass therethrough. A portion of the opening portion of the at least one insulating support portion which has a smallest cross-sectional area in the opening portion lies inside of an edge of a corresponding one of the at least one through hole of the bearing holder when viewed in the axial direction.

Each of the above embodiments of the present invention is able to provide a motor which is configured to prevent the coil ends from undergoing a short circuit and to facilitate positioning of the coil ends.

The above and other elements, features, steps, characteristics and advantages of at least an embodiment of the present invention will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, motors according to embodiments of the present invention will be described with reference to the accompanying drawings. Note that the scope of the present invention is not limited to the embodiments described below, but includes any modification thereof within the scope of the technical idea of the present invention. Also note that scales, numbers, and so on of members or portions illustrated in the following drawings may differ from those of actual members or portions, for the sake of easier understanding of the members or portions.

In the accompanying drawings, a z-axis, which is parallel to a central axis J of a motor, is shown. In the following description, a positive side (i.e., a +z side) in a z-axis direction will be referred to as an upper side, and a negative side (i.e., a −z side) in the z-axis direction will be referred to as a lower side. In addition, in the following description, unless otherwise specified, radial directions centered on the central axis J, which extends in a vertical direction (i.e., the z-axis direction), will be simply referred to by the term "radial direction", "radial", or "radially", a circumferential direction about the central axis J will be simply referred to by the term "circumferential direction", "circumferential", or "circumferentially", and a direction parallel to the central axis J (i.e., the vertical direction or the z-axis direction) will be referred to by the term "axial direction", "axial", or "axially".

In addition, it is assumed herein that the wording "to extend in the axial direction", "to extend axially", or the like as used herein includes not only to extend exactly in the direction parallel to the central axis J but also to extend in a direction at an angle of less than 45 degrees to the axial direction. It is also assumed herein that the wording "to extend in a radial direction", "to extend radially", or the like as used herein includes not only to extend exactly in a radial direction or exactly radially, that is, exactly in a direction or directions perpendicular to the vertical direction (i.e., the z-axis direction), but also to extend in a direction or directions at an angle of less than 45 degrees to the radial direction(s).

Motor

Figure 1:
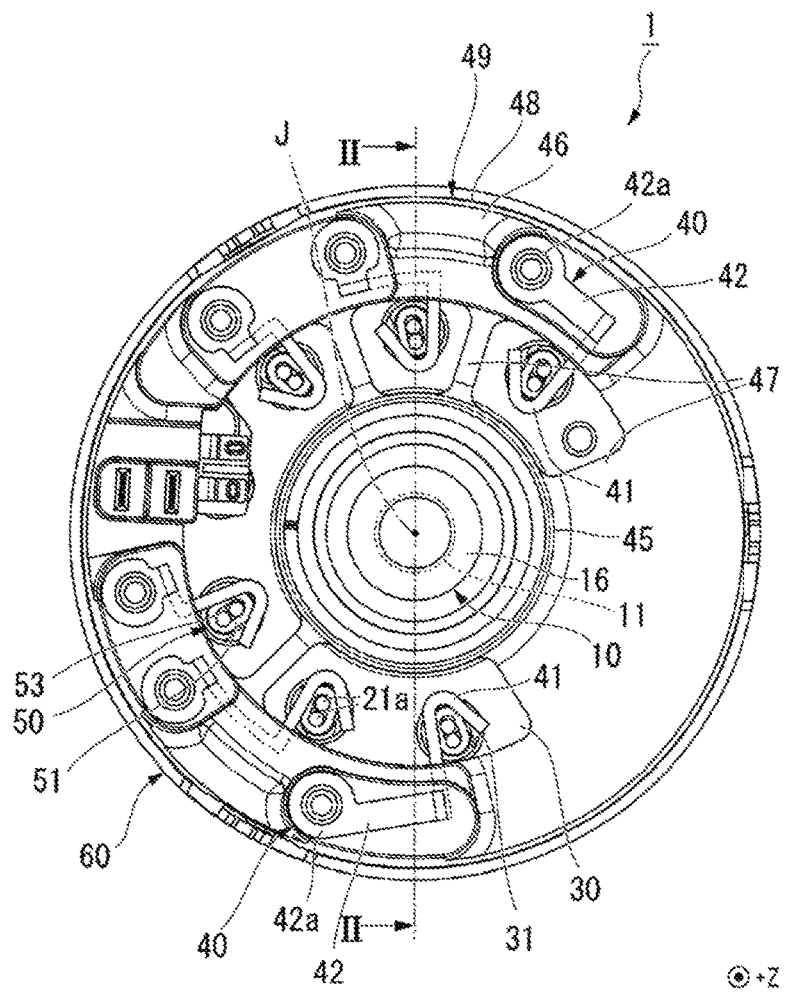
FIG. 1 is a plan view of a motor according to at least an embodiment of the present invention.
Figure 2:
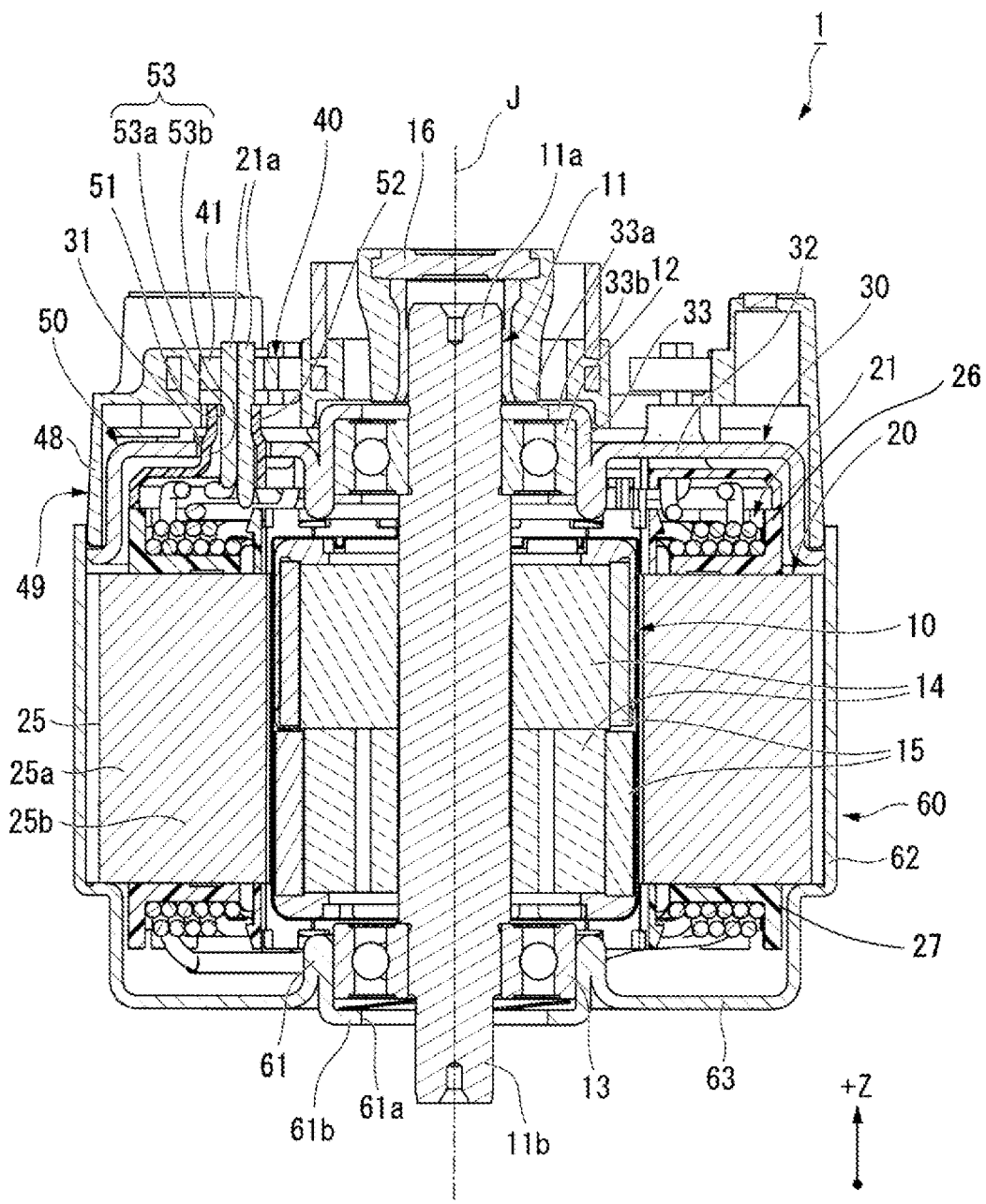
FIG. 2 is a cross-sectional view of the motor according to the above embodiment of the present invention.
Figure 3:
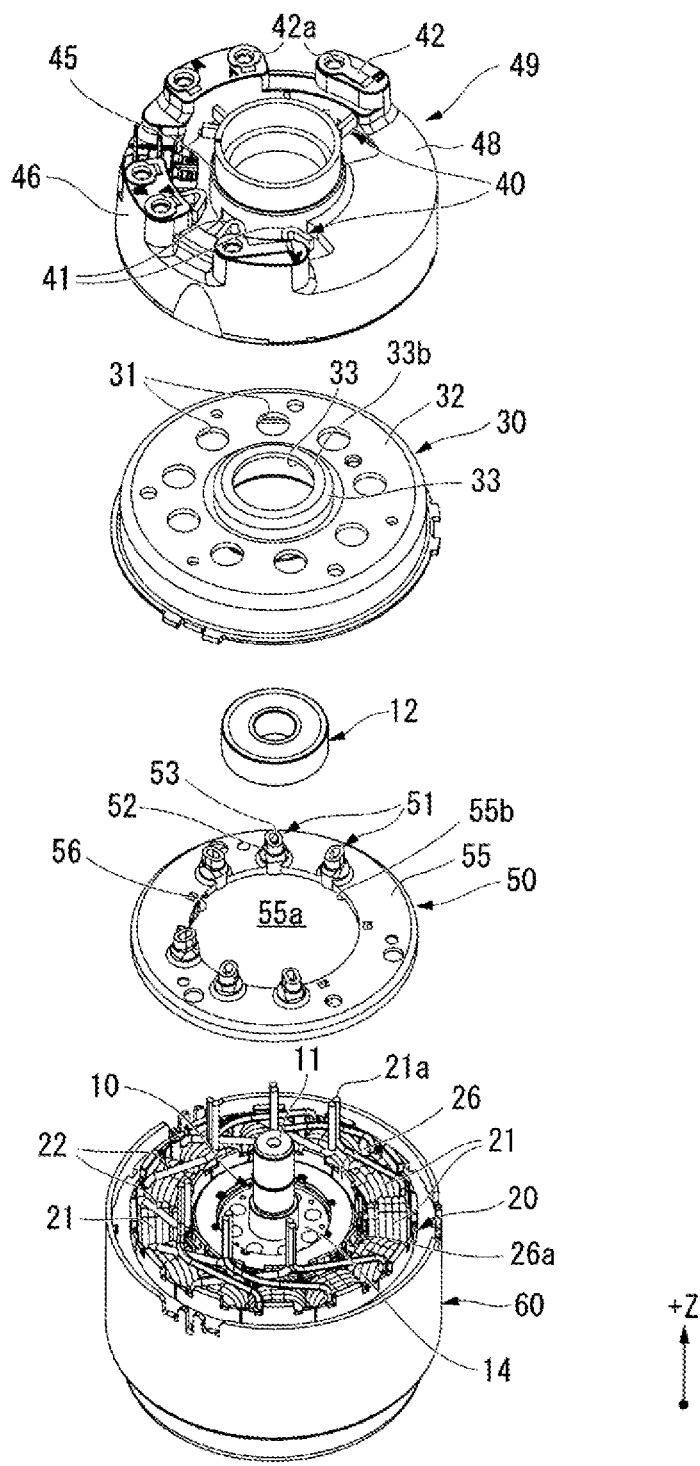
FIG. 3 is an exploded perspective view of the motor according to the above embodiment of the present invention.

FIG. 1 is a plan view (i.e., a view from the +z side) of a motor 1 according to at least an embodiment of the present invention. FIG. 2 is a cross-sectional view of the motor 1 taken along line II-II in FIG. 1. FIG. 3 is an exploded view of the motor 1.

Referring to FIG. 2, the motor 1 according to the present embodiment includes a rotor 10, a stator 20, a first bearing 12, a second bearing 13, a bearing holder 30, a busbar unit 49 including busbars 40, a coil support 50, and a housing 60.

Rotor

Referring to FIG. 2, the rotor 10 includes a shaft 11, rotor cores 14, and rotor magnets 15. The shaft 11 has the central axis J, which extends in the axial direction (i.e., the z-axis direction), as a center thereof. The shaft 11 is supported by the first and second bearings 12 and 13 to be rotatable about the central axis J. An upper end portion 11a of the shaft 11 is arranged to project above the bearing holder 30. In addition, a sensor magnet 16 is fixed to the upper end portion 11a of the shaft 11. On an upper side of the sensor magnet 6, a sensor element (not shown) is arranged opposite to the sensor magnet 6, and a rotation angle of the shaft 11 is measured through the sensor element. A lower end portion 11b of the shaft 11 is arranged to project out of the housing 60 through an output shaft hole portion 61a. An object to be driven by the motor 1 is fitted to the lower end portion 11b of the shaft 11.

Each rotor core 14 is fixed to the shaft 11. Each rotor core 14 is arranged to extend in a circumferential direction to surround the shaft 11. Each rotor magnet 15 is fixed to an outside surface of a corresponding one of the rotor cores 14, the outside surface extending in the circumferential direction. The rotor cores 14 and the rotor magnets 15 are arranged to rotate together with the shaft 11.

Stator

Referring to FIG. 2, the stator 20 is arranged radially outside of and opposite to the rotor 10 to surround the rotor 10. The stator 20 includes a stator core 25, an upper insulator 26, a lower insulator 27, and a plurality of coils 21. The stator core 25 includes a core back portion 25a and a plurality of tooth portions 25b arranged to extend radially inward from the core back portion 25a. The coils 21 are wound around the tooth portions 25b with portions of the upper and lower insulators 26 and 27 intervening therebetween.

The upper insulator 26 is arranged above the stator core 25. The lower insulator 27 is arranged below the stator core 25. The upper and lower insulators 26 and 27 are arranged to cover circumferential end surfaces and axial end surfaces of each of the tooth portions 25b of the stator core 25.

Figure 4:
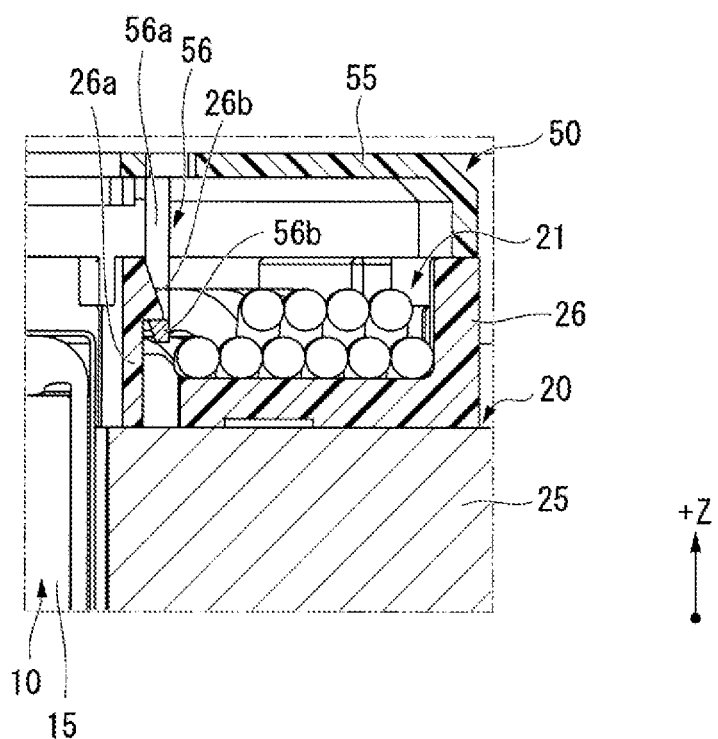
FIG. 4 is a partial cross-sectional view of the motor according to the above embodiment of the present invention.

FIG. 4 is a partial cross-sectional view of the motor 1 taken along a plane including the central axis J but different from a plane along which the cross-sectional view of FIG. 2 is taken. Referring to FIG. 4, the upper insulator 26 includes a plurality of claw portions 26a each of which is arranged to extend upward. The claw portions 26a are arranged along an inner circumferential edge of the stator 20. A projection 26b projecting radially outward is provided at an upper end portion of each claw portion 26a. The projection 26b at the upper end portion of each claw portion 26a is engaged with one of a plurality of claw receiving portions 56 of the coil support 50, which will be described below.

Figure 5:
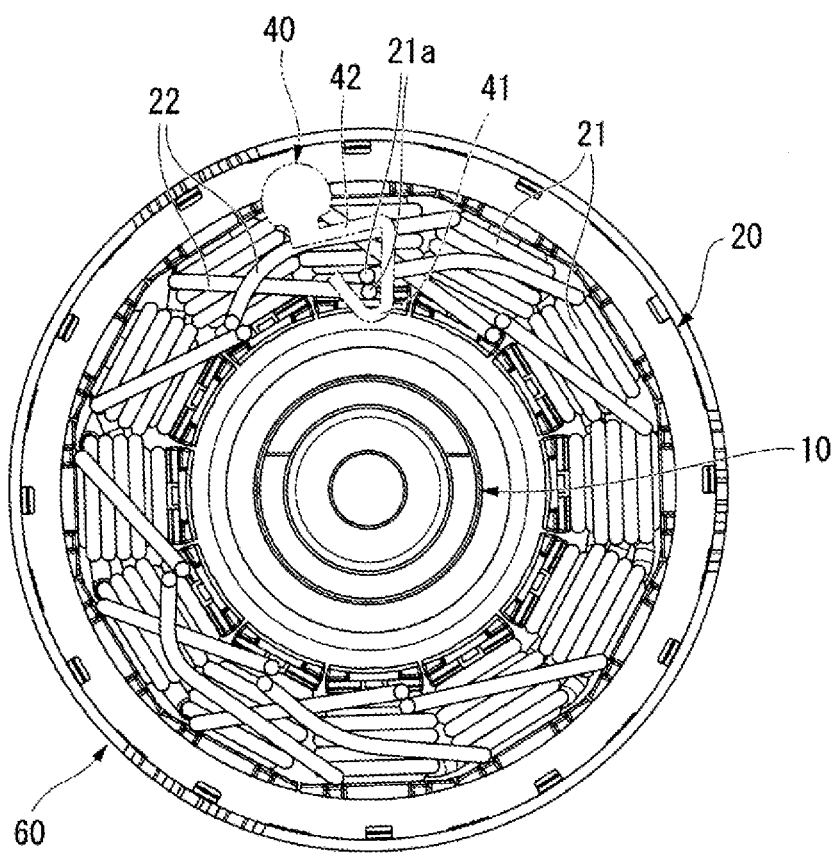
FIG. 5 is a plan view of a stator according to the above embodiment of the present invention.

FIG. 5 is a plan view (i.e., a view from the +z side) of the stator 20. In FIG. 5, the stator 20 is accommodated in the housing 60. In FIG. 5, only one of the busbars 40 is shown for purposes of illustration. Referring to FIG. 5, the number of coils 21 included in the stator 20 according to the present embodiment is twelve. A coil wire 22 extends out of each coil 21. The coil wire 22 is arranged to pass above the stator 20, and is drawn to a position under a corresponding one of opening portions 53 (see FIG. 1) of the coil support 50. A coil end 21a of the coil wire 22, which is an end portion of the coil wire 22, is arranged to pass through the corresponding opening portion 53, and is connected to a corresponding one of the busbars 40 above the corresponding opening portion 53.

The twelve coils 21 are arranged to define two three-phase circuits. In one of the three-phase circuits, two of the coils 21 are used for each of a U phase, a V phase, and a W phase. In the other three-phase circuit, two of the coils 21 are used for each of a U' phase, a V' phase, and a W' phase. The coil ends 21a of the coil wires 22 extending from the two coils 21 used for each phase in each three-phase circuit are connected to the same busbar 40. Accordingly, the coils 21 used for the same phase in each three-phase circuit are connected in parallel.

From each coil 21, two portions of the corresponding coil wire 22 are drawn out one upwardly and the other downwardly. Each coil end 21a is an end portion of the portion of the corresponding coil wire 22 which is drawn out upwardly from a winding start point or a winding end point of the corresponding coil 21. In the present embodiment, from the winding start point or the winding end point of each coil 21, a portion of the corresponding coil wire 22 is drawn in the axial direction toward a connection terminal (i.e., upward) at a radially outer position on the stator 20. This portion of the coil wire 22 extending from the coil 21 is drawn radially inward from a radially outer position above the stator 20, and the coil end 21a thereof is connected to a corresponding one of the busbars 40 at a radially inner position above the stator 20. Accordingly, above an upper surface of the stator 20, portions of the coil wires 22 are not concentrated on either a radially inner side or a radially outer side, and vertical (i.e., axial) overlapping of the coil wires 22 is minimized in arranging the portions of the coil wires 22, which contributes to minimizing an increase in the axial dimension of the stator 20.

Bearing

Referring to FIG. 2, the first and second bearings 12 and 13 are arranged to rotatably support the shaft 11. The first bearing 12 is arranged above the stator 20. The second bearing 13 is arranged below the stator 20. The structure of each of the first and second bearings 12 and 13 is not limited in any particular manner, and any known bearing may be used.

Bearing Holder

Referring to FIG. 2, the bearing holder 30 is arranged above the stator 20 to cover the stator 20 from axially above. The bearing holder 30 is arranged to support the first bearing 12. The bearing holder 30 is fixed to the housing 60. The bearing holder 30 is, for example, circular and is coaxial with the shaft 11 in a plan view (i.e., in an x-y plan view). The bearing holder 30 includes a first bearing holding portion 33 and a disk-shaped portion 32.

The first bearing holding portion 33 is cylindrical and is coaxial with the shaft 11. An outer race of the first bearing 12 is fitted to a radially inner side of the first bearing holding portion 33. The first bearing holding portion 33 includes an upper edge portion 33b arranged to extend radially inward from an upper end thereof. A hole portion 33a, which is circular and is coaxial with the shaft 11, is defined in a center of the upper edge portion 33b. The shaft 11 is arranged to pass through the hole portion 33a.

The disk-shaped portion 32 is arranged to extend radially outward from the first bearing holding portion 33. Upper and lower surfaces of the disk-shaped portion 32 are both perpendicular to the central axis J. The disk-shaped portion 32 includes a plurality of through holes 31 defined therein. That is, the bearing holder 30 includes the plurality of through holes 31 defined therein. Each through hole 31 is arranged to pass through the bearing holder 30 in the axial direction. Each through hole 31 is arranged to have a corresponding one or ones of the coil ends 21a of the coil wires 22 extending from the coils 21 pass therethrough. In the present embodiment, each through hole 31 is arranged to have two (i.e., a plurality) of the coil ends 21a pass therethrough.

The bearing holder 30 is made of a metal. Accordingly, the bearing holder 30 has a high rigidity, and is able to securely support the first bearing 12. This contributes to preventing the shaft 11, which is supported by the bearing holder 30 through the first bearing 12, from wobbling with respect to the central axis J even under vibration conditions. Thus, the motor 1 is able to exhibit stable rotation performance even under vibration conditions.

Housing

The housing 60 is arranged to support the stator 20 and the second bearing 13. Referring to FIG. 2, the housing 60 is in the shape of a tube that opens upwardly. The housing 60 includes a motor tubular portion 62, a bottom portion 63, and a second bearing holding portion 61.

The motor tubular portion 62 is cylindrical, and is arranged radially outside of the stator 20 to surround the stator 20. The stator 20 is fixed to an inside surface of the motor tubular portion 62. The bottom portion 63 is arranged at a lower end of the motor tubular portion 62. The second bearing holding portion 61 is arranged at a center of the bottom portion 63 in a plan view. The second bearing holding portion 61 is cylindrical and is coaxial with the shaft 11. An outer race of the second bearing 13 is fitted to a radially inner side of the second bearing holding portion 61. The second bearing holding portion 61 includes a lower edge portion 61b arranged to extend radially inward from a lower end thereof. The output shaft hole portion 61a, which is circular and is coaxial with the shaft 11, is defined in a center of the lower edge portion 61b.

Busbar Unit

Referring to FIG. 2, the busbar unit 49 is arranged above the bearing holder 30. The busbar unit 49 is arranged to cover an upper opening of the housing 60. The busbar unit 49 is fixed to the housing 60. The busbar unit 49 includes a busbar holder 48 and the busbars 40, which are six in number.

Referring to FIG. 1, each busbar 40 includes a body portion 42 and a connection terminal 41. The body portion 42 includes a socket portion 42a arranged to establish a connection with an external device (not shown).

Each connection terminal 41 is connected with corresponding ones of the coil ends 21a of the coil wires 22 extending from the coils 21. The connection terminal 41 is in the shape of the letter "U" with an opening facing radially outward. The coil ends 21a are placed between portions of the connection terminal 41, and are welded to the connection terminal 41 to establish a connection therebetween. FIG. 1 illustrates a situation in which each connection terminal 41 and the corresponding coil ends 21a have not yet been connected with each other. Pressure is applied by electrodes (not shown) to the connection terminal 41 with the coil ends 21a being held between the portions of the connection terminal 41, and electric current is passed between the electrodes to weld (i.e., resistance weld) the coil ends 21a to the connection terminal 41.

The connection terminal 41 is arranged to extend radially inward from the body portion 42. Above the stator 20, each coil end 21a is drawn from a radially outer position to a radially inner position, and is connected to a corresponding one of the connection terminals 41.

In the present embodiment, two (i.e., a plurality) of the coil ends 21a are connected to each connection terminal 41. The coil ends 21a connected to the same connection terminal 41 are used for the same phase. Connecting a plurality of coil ends 21a to each of the connection terminals 41 of the busbars 40 as described above leads to a reduction in the number of busbars 40. In addition, the coil ends 21a used for the same phase can be connected together by connecting the coil ends 21a used for the same phase to the same connection terminal 41. This eliminates the need for a process of connecting the coil ends 21a together in a process of manufacturing the motor 1, which leads to simplifying the manufacturing process.

The busbar holder 48 is made of a resin material, and the unified busbar unit 49 is defined by an insert molding process with a portion of each busbar 40 buried in the busbar holder 48. Referring to FIG. 1, the busbar holder 48 includes a cylindrical portion 45, a busbar holding portion 46, and a plurality of bridge portions 47. The cylindrical portion 45 is cylindrical and is coaxial with the shaft 11, and opens both upwardly and downwardly. The shaft 11 is arranged to pass through inside of the cylindrical portion 45. The busbar holding portion 46 is annular, and is arranged to surround the cylindrical portion 45 from radially outside. The body portion 42 of each busbar 40 is buried in the busbar holding portion 46. Each bridge portion 47, which is arranged to extend in a radial direction, is defined between the cylindrical portion 45 and the busbar holding portion 46. In addition, the connection terminal 41 of each busbar 40 is arranged between the cylindrical portion 45 and the busbar holding portion 46.

Coil Support

Referring to FIG. 2, the coil support 50 is arranged between the stator 20 and the bearing holder 30. The coil support 50 is fixed to the stator 20. The coil support 50 is made of an insulating material, such as, for example, a resin.

Referring to FIG. 3, the coil support 50 includes an annular plate portion 55, a plurality of (six) insulating support portions 51, and the plurality of claw receiving portions 56. Each insulating support portion 51 includes the opening portion 53, through which a corresponding one of the coil ends 21a is arranged to pass.

The annular plate portion 55 is defined by an annular plate material, and upper and lower surfaces of the annular plate portion 55 are perpendicular to the central axis J. A circular opening 55a, which is coaxial with the shaft 11, is defined in a center of the annular plate portion 55. The shaft 11 is arranged to pass through the circular opening 55a. The annular plate portion 55 is arranged above the stator 20 and below the bearing holder 30. Accordingly, the annular plate portion 55 is arranged to cover an upper side of the portions of the coil wires 22 arranged above the stator 20 (see FIG. 5) to provide isolation between the coil wires 22 and the bearing holder 30.

Referring to FIG. 4, each of the plurality of claw receiving portions 56 is arranged to extend downward from an inner circumferential edge 55b of the annular plate portion 55. The claw receiving portions 56 are arranged to overlap with the claw portions 26a of the upper insulator 26 when viewed in the axial direction. Each claw receiving portion 56 includes a pair of supporting shafts 56a arranged to extend downward, and a bottom claw receiver 56b arranged to join lower ends of the supporting shafts 56a to each other, and has the shape of a rectangular frame.

With the bottom claw receiver 56b of each claw receiving portion 56, the projection 26b of a corresponding one of the claw portions 26a of the upper insulator 26 is engaged. That is, each claw receiving portion 56 of the coil support 50 and the corresponding claw portion 26a of the upper insulator 26 together define a snap fit. The coil support 50 is thus fixed to the upper insulator 26 through snap fitting. The coil support 50 can be easily fixed to the stator 20 by properly aligning the coil support 50 with the stator 20 circumferentially and pressing the coil support 50 onto the stator 20.

According to the present embodiment, fixing of the coil support 50 to the stator 20 makes it easier to insert the coil ends 21a through the opening portions 53 and the through holes 31. An operator who assembles the motor 1 according to the present embodiment fits the coil support 50 to the stator 20 while passing the coil ends 21a through the opening portions 53 of the coil support 50. The operator then carries out fitting of the bearing holder 30 while passing the coil ends 21a through the through holes 31 of the bearing holder 30 above the coil support 50. As described above, the fixing of the coil support 50 to the stator 20 makes it possible to insert the coil ends 21a through the opening portions 53 and the through holes 31 in separate steps of the assembling process. Moreover, at the step of fitting the bearing holder 30, the coil ends 21a are supported by the coil support 50, and it is therefore easy to insert the coil ends 21a through the through holes 31. Suppose that the coil support 50 is fixed to the bearing holder 30, as a comparative example. In this case, the operator would need to insert the coil ends 21a through the opening portions 53 of the coil support 50 and the through holes 31 of the bearing holder 30 successively. Moreover, this insertion would be difficult, because no support would be provided for the coil ends 21a during this insertion step.

Referring to FIG. 3, the insulating support portions 51 of the coil support 50 are aligned in the circumferential direction along the inner circumferential edge 55b of the annular plate portion 55. Each insulating support portion 51 includes the opening portion 53, which is arranged to pass through the insulating support portion 51 in the axial direction. In addition, the insulating support portion 51 includes a wall portion 52 arranged to extend in the axial direction toward the bearing holder 30 (i.e., upward) from an edge of the opening portion 53.

Referring to FIG. 1, each opening portion 53 is a radially elongated hole with rounded corners when viewed in the axial direction. In the present embodiment, two (i.e., a plurality) of the coil ends 21a are passed through each opening portion 53. The coil ends 21a passed through the same opening portion 53 are used for the same phase. Passing the coil ends 21a used for the same phase together through the same opening portion 53 contributes to preventing a short circuit between the coil ends 21a used for different phases. In addition, each opening portion 53 serves to make a bundle of the coil ends 21a which are connected to a corresponding one of the connection terminals 41 of the busbars 40, and this facilitates the connection of each coil end 21a to a corresponding one of the connection terminals 41.

Referring to FIG. 2, each opening portion 53 includes a first region 53a and a second region 53b, which are arranged one above the other in the axial direction and have different sizes. The first region 53a is arranged above the second region 53b, that is, on an opposite side of the second region 53b with respect to the stator 20. The opening portion 53 is arranged to have a greater cross-sectional area in the second region 53b than in the first region 53a. The first region 53a corresponds to a portion of the opening portion 53 which has the smallest cross-sectional area in the opening portion 53. The first and second regions 53a and 53b are joined to each other in a gentle manner through a tapered surface. That is, the opening portion 53 is arranged to increase in the cross-sectional area toward the stator 20 (i.e., in a downward direction). Since the coil ends 21a are inserted into the opening portion 53 from the direction of the stator 20, the above arrangement of increasing the cross-sectional area of the opening portion 53 in the downward direction facilitates the inserting operation.

The first region 53a of each opening portion 53 (i.e., the portion of the opening portion 53 which has the smallest cross-sectional area in the opening portion 53) lies inside of an edge of a corresponding one of the through holes 31 of the bearing holder 30 when viewed in the axial direction. The coil ends 21a which pass through the opening portion 53 pass inside of the edge of the corresponding through hole 31 of the bearing holder 30. The opening portion 53 thus prevents the coil ends 21a from making contact with the bearing holder 30.

The wall portion 52 is tubular, and is arranged to extend upward from the edge of the opening portion 53. That is, the opening portion 53 is defined inside the wall portion 52. The wall portion 52 is arranged to surround and support a combined outer circumference of the coil ends 21a. This enables the wall portion 52 to support the combined outer circumference of the coil ends 21a over a sufficient axial extent to securely support the coil ends 21a.

The wall portion 52 is arranged to pass through a corresponding one of the through holes 31 of the bearing holder 30. The wall portion 52 is arranged between the combined outer circumference of the coil ends 21a and a wall surface of the corresponding through hole 31 of the bearing holder 30. The wall portion 52 thus separates the coil ends 21a from the wall surface of the corresponding through hole 31 to provide more secure isolation between the coil ends 21a and the bearing holder 30.

In the motor 1 according to the present embodiment, the support of the coil ends 21a by the insulating support portions 51 of the coil support 50 accomplishes the positioning of the coil ends 21a. Thus, the coil ends 21a can be easily connected to the corresponding connection terminals 41 of the busbars 40. Moreover, the support of the coil ends 21a by the insulating support portions 51 of the coil support 50 prevents the coil ends 21a from making contact with the wall surfaces of the corresponding through holes 31 of the bearing holder 30. This leads to more secure isolation between the coil ends 21a and the bearing holder 30 to increase stability of an operation of the motor 1.

FIRST, SECOND, AND THIRD MODIFICATIONS

Figure 6:
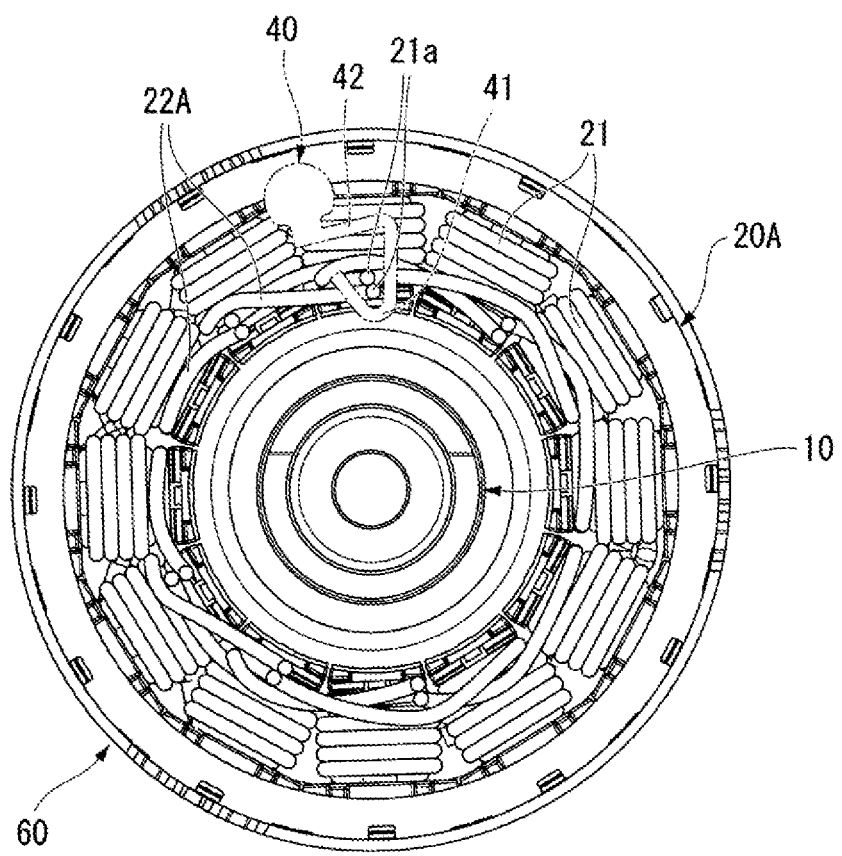
FIG. 6 is a plan view of a stator according to a first modification of the above embodiment of the present invention.
Figure 7:
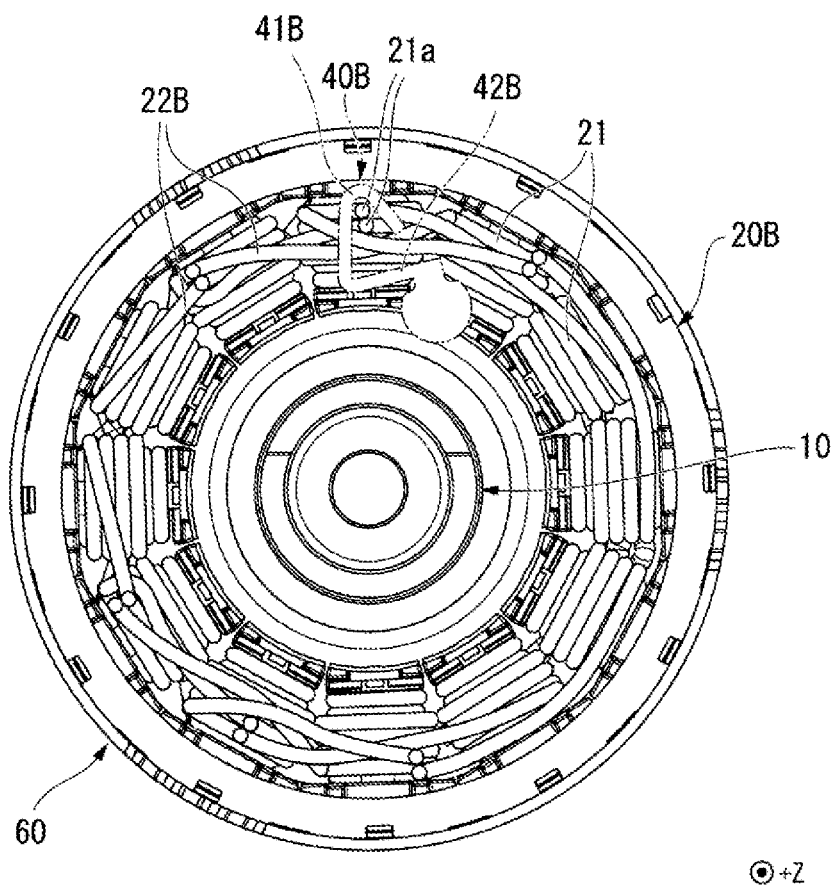
FIG. 7 is a plan view of a stator according to a second modification of the above embodiment of the present invention.
Figure 8:
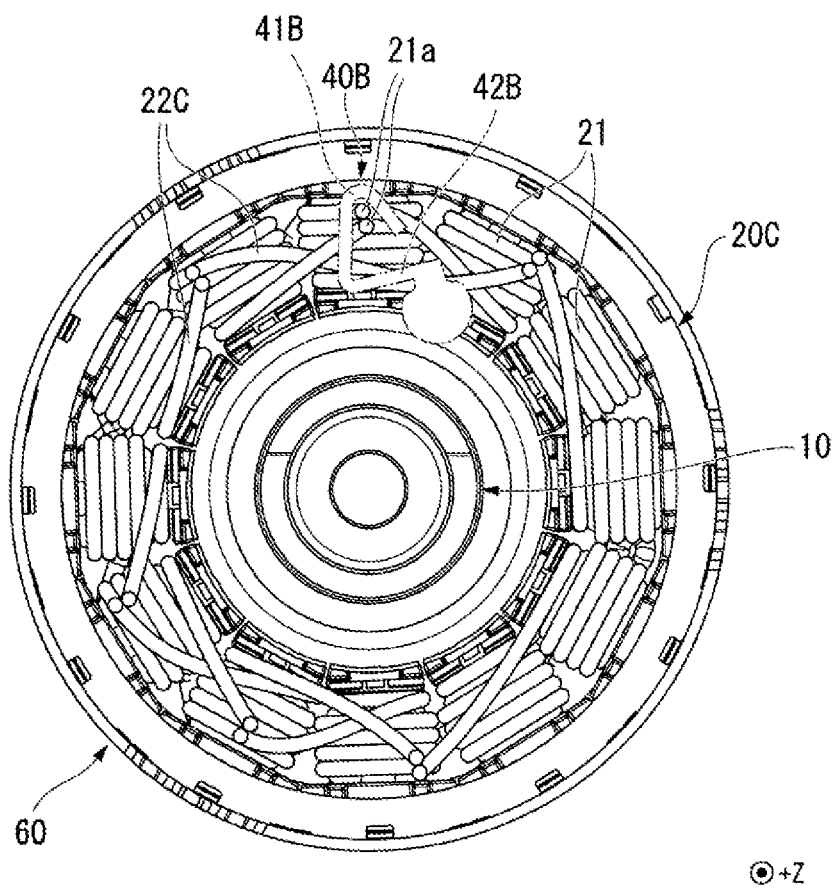
FIG. 8 is a plan view of a stator according to a third modification of the above embodiment of the present invention.

Next, stators 20A, 20B, and 20C according to first, second, and third modifications, respectively, of the above-described embodiment, each of which is applicable to the above-described motor 1, will now be described below. FIGS. 6, 7, and 8 are plan views of the stators 20A, 20B, and 20C according to the first, second, and third modifications, respectively. In FIGS. 6, 7, and 8, the stators 20A, 20B, and 20C, respectively, are accommodated in the housing 60. In each of FIGS. 6, 7, and 8, only one of the busbars is shown for purposes of illustration.

Each of the stators 20A, 20B, and 20C according to the first, second, and third modifications, respectively, is different from the stator 20 according to the above-described embodiment in the position at which the coil wire 22 is drawn upward from the winding start point or the winding end point of each coil 21 or in the position at which each coil end 21a is connected to a corresponding one of the busbars.

In the first modification illustrated in FIG. 6, each busbar 40 includes a body portion 42 and a connection terminal 41 arranged to extend radially inward from the body portion 42, similarly to each busbar 40 according to the above-described embodiment. In addition, in the stator 20A, a coil wire 22A is drawn upward from a winding start point or a winding end point of each coil 21 at a radially inner position on the stator 20A. In the stator 20A, the coil end 21a of the coil wire 22A extending from each coil 21 is connected to a corresponding one of the busbars 40 at a radially inner position above the stator 20A. Portions of the coil wires 22A drawn from and arranged above the stator 20A are concentrated on a radially inner side above the stator 20A. According to the present modification, the length of each of the portions of the coil wires 22A arranged above the stator 20A is reduced to make it easier to arrange the portions of the coil wires 22A above the stator 20A.

In the second modification illustrated in FIG. 7, busbars 40B each include a body portion 42B and a connection terminal 41B arranged to extend radially outward from the body portion 42B. In addition, in the stator 20B, a coil wire 22B is drawn upward from a winding start point or a winding end point of each coil 21 at a radially outer position on the stator 20B. In the stator 20B, a coil end 21a of the coil wire 22B extending from each coil 21 is connected to a corresponding one of the busbars 40B at a radially outer position above the stator 20B. Portions of the coil wires 22B drawn from and arranged above the stator 20B are concentrated on a radially outer side above the stator 20B. In the present modification, as well as in the first modification, the length of each of the portions of the coil wires 22B arranged above the stator 20B is reduced to make it easier to arrange the portions of the coil wires 22B above the stator 20B.

In the third modification illustrated in FIG. 8, as well as in the second modification, busbars 40B each include a body portion 42B and a connection terminal 41B arranged to extend radially outward from the body portion 42B. In addition, in the stator 20C, a coil wire 22C is drawn upward from a winding start point or a winding end point of each coil 21 at a radially inner position on the stator 20C. In the stator 20C, a coil end 21a of the coil wire 22C extending from each coil 21 is connected to a corresponding one of the busbars 40B at a radially outer position above the stator 20C. Portions of the coil wires 22C arranged above the stator 20C are each drawn from a radially inner position to a radially outer position. Accordingly, the portions of the coil wires 22C are not concentrated on either a radially inner side or a radially outer side. In the present modification, vertical (i.e., axial) overlapping of the coil wires 22C is minimized in arranging the portions of the coil wires 22C above the stator 20C, which contributes to minimizing an increase in the axial dimension of the stator 20C.

FOURTH MODIFICATION

Figure 9:
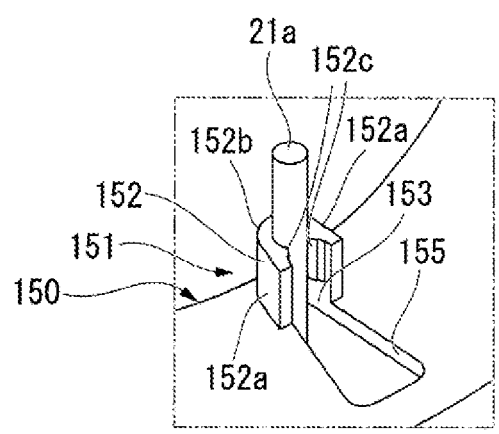
FIG. 9 is a perspective view of a portion of a coil support according to a fourth modification of the above embodiment of the present invention.

Next, a coil support 150 according to a fourth modification of the above-described embodiment, which is applicable to the above-described motor 1, will now be described below. FIG. 9 is a perspective view of an insulating support portion 151 of the coil support 150 according to the present modification. The coil support 150 according to the present modification is different from the coil support 50 according to the above-described embodiment in the structure of the insulating support portion 151.

The insulating support portion 151 includes an opening portion 153 arranged to pass therethrough in the axial direction. The insulating support portion 151 is arranged to have one coil end 21a pass therethrough. The insulating support portion 151 further includes a guide hole 155 arranged to pass therethrough in the axial direction and extend in one direction (radially outward) from the opening portion 153.

The insulating support portion 151 includes a wall portion 152 arranged to extend upward in the axial direction from an edge of the opening portion 153. The wall portion 152 is arranged to open in one direction (radially outwardly) on a plane perpendicular to the axial direction. The direction in which the wall portion 152 opens corresponds with the direction in which the guide hole 155 extends from the opening portion 153. The wall portion 152 is arranged to extend only from the edge of the opening portion 153 and not from an edge of the guide hole 155. It is assumed herein that, of a hole made up of a combination of the opening portion 153 and the guide hole 155 joined to each other, an area inside of the wall portion 152 is defined as the opening portion 153, and the remaining area is defined as the guide hole 155.

The wall portion 152 is in the shape of the letter "U" in a plan view. The wall portion 152 includes a pair of opposed walls 152a, which are opposed to each other, and a joining wall 152b arranged radially inside to join the opposed walls 152a to each other. Opposed wall surfaces of the pair of opposed walls 152a each include a raised portion 152c. The distance between the paired raised portions 152c is slightly smaller than the wire diameter of the coil end 21a. An area inside of the wall portion 152 and surrounded by the paired raised portions 152c and the joining wall 152b has a shape matching the external shape of the coil end 21a in a plan view. The wall portion 152 supports the coil end 21a with the paired raised portions 152c and the joining wall 152b surrounding the coil end 21a.

The area inside of the wall portion 152 and surrounded by the paired raised portions 152c and the joining wall 152b corresponds to a portion of the opening portion 153 which has the smallest cross-sectional area in the opening portion 153. The portion of the opening portion 153 which has the smallest cross-sectional area in the opening portion 153 lies inside of an edge of a corresponding one of the through holes 31 of the bearing holder 30 when viewed in the axial direction. This enables the coil end 21a to be supported inside of an edge of the corresponding through hole 31 of the bearing holder 30 to prevent the coil end 21a from making contact with the edge of the corresponding through hole 31.

Next, a process of inserting the coil end 21a into the opening portion 153 of the insulating support portion 151 according to the present modification will now be described below. An operator first inserts the coil end 21a into the guide hole 155. Then, the operator moves the coil end 21a radially inward beyond the paired raised portions 152c with an outer circumferential surface of the coil end 21a pushing the paired raised portions 152c away from each other, so that the coil end 21a fits in a space radially inside of the paired raised portions 152c. As a result, the coil end 21a is supported by the wall portion 152.

The guide hole 155, which extends from the opening portion 153 of the insulating support portion 151 according to the present modification, makes it easier to insert the coil end 21a into the opening portion 153. Moreover, fitting the coil end 21a in the space radially inside of the raised portions 152c contributes to more secure support of the coil end 21a. Furthermore, the distance between the paired raised portions 152c being smaller than the wire diameter of the coil end 21a contributes to preventing the coil end 21a from moving out of the opening portion 153 into the guide hole 155, and more secure isolation between the coil end 21a and the bearing holder 30 is thus achieved.

Similarly to the wall portion 52 according to the above-described embodiment, the wall portion 152 is arranged to extend upward and pass through the corresponding through hole 31 of the bearing holder 30 (see FIG. 2). Accordingly, the wall portion 152 is arranged between at least a portion of an outer circumference of the coil end 21a and the wall surface of the corresponding through hole 31 of the bearing holder 30. This arrangement of the wall portion 152 provides more secure isolation between the coil end 21a and the bearing holder 30.

Note that the guide hole 155 may alternatively be defined by a cut which opens in one direction (radially outwardly) in the coil support 150 in a plan view. In the present modification, each opening portion 153 is arranged to have only one coil end 21a pass therethrough. Note, however, that each opening portion 153 may alternatively be arranged to have two or more coil ends 21a of coil wires extending from the coils 21 used for the same phase pass therethrough.

FIFTH MODIFICATION

Figure 10:
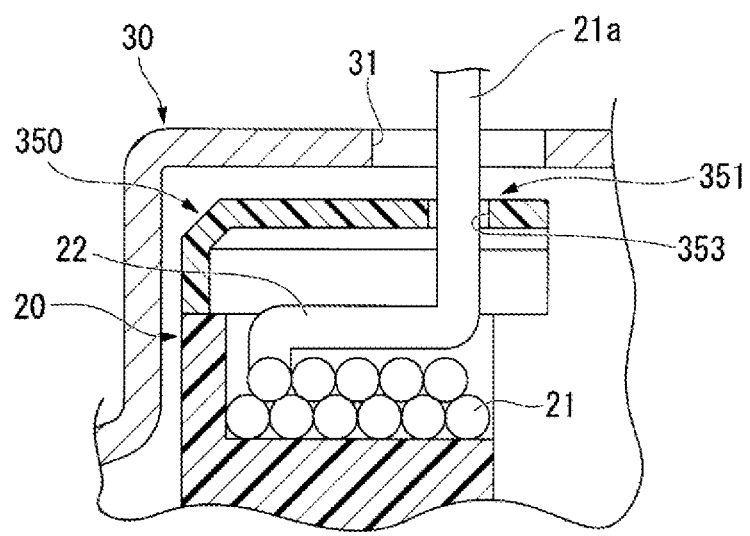
FIG. 10 is a cross-sectional view of a portion of a motor including a coil support according to a fifth modification of the above embodiment of the present invention.

Next, a coil support 350 according to a fifth modification of the above-described embodiment, which is applicable to the above-described motor 1, will now be described below. FIG. 10 is a partial cross-sectional view of a motor 1 in which the coil support 350 according to the fifth modification is adopted. The coil support 350 according to the present modification is different from the coil support 50 according to the above-described embodiment primarily in the structure of insulating support portions 351. Each insulating support portion 351 of the coil support 350 does not include the wall portion.

The coil support 350 is arranged between a stator 20 and a bearing holder 30. The coil support 350 is fixed to the stator 20. The coil support 350 includes the insulating support portions 351. Each insulating support portion 351 includes an opening portion 353 arranged to pass therethrough in the axial direction. A coil end 21a is arranged to pass through the opening portion 353. Note that, in the present modification, each opening portion 353 may alternatively be arranged to have two or more coil ends 21a pass therethrough.

The opening portion 353 is arranged to have an opening diameter smaller than that of a corresponding through hole 31 of the bearing holder 30. The opening portion 353 has a uniform diameter throughout the axial extent thereof, and can be considered to have the smallest cross-sectional area throughout the axial extent thereof. The opening portion 353 lies inside of an edge of the corresponding through hole 31 when viewed in the axial direction. The coil end 21a which passes through the opening portion 353 passes inside of an edge of the corresponding through hole 31 of the bearing holder 30. The opening portion 353 can thus prevent the coil end 21a from making contact with the bearing holder 30.

In the present modification, the coil support 350 does not include a wall portion extending from a periphery of each opening portion 353. Even in this case, if a portion of the opening portion 353 which has the smallest cross-sectional area in the opening portion 353 lies inside of the edge of the corresponding through hole 31 when viewed in the axial direction, a contact between the coil end 21a and the bearing holder 30 can be prevented to provide isolation between the coil end 21a and the bearing holder 30. Note that the smaller the diameter of the portion of the opening portion 353 which has the smallest cross-sectional area in the opening portion 353 is relative to the diameter of the corresponding through hole 31, the more easily the isolation between the coil end 21a and the bearing holder 30 can be ensured, even when the coil end 21a is inclined. Also note that the closer the opening portion 353 is to the corresponding through hole 31, the more easily the isolation between the coil end 21a and the bearing holder 30 can be ensured, even when the coil end 21a is inclined.

SIXTH MODIFICATION

Figure 11:
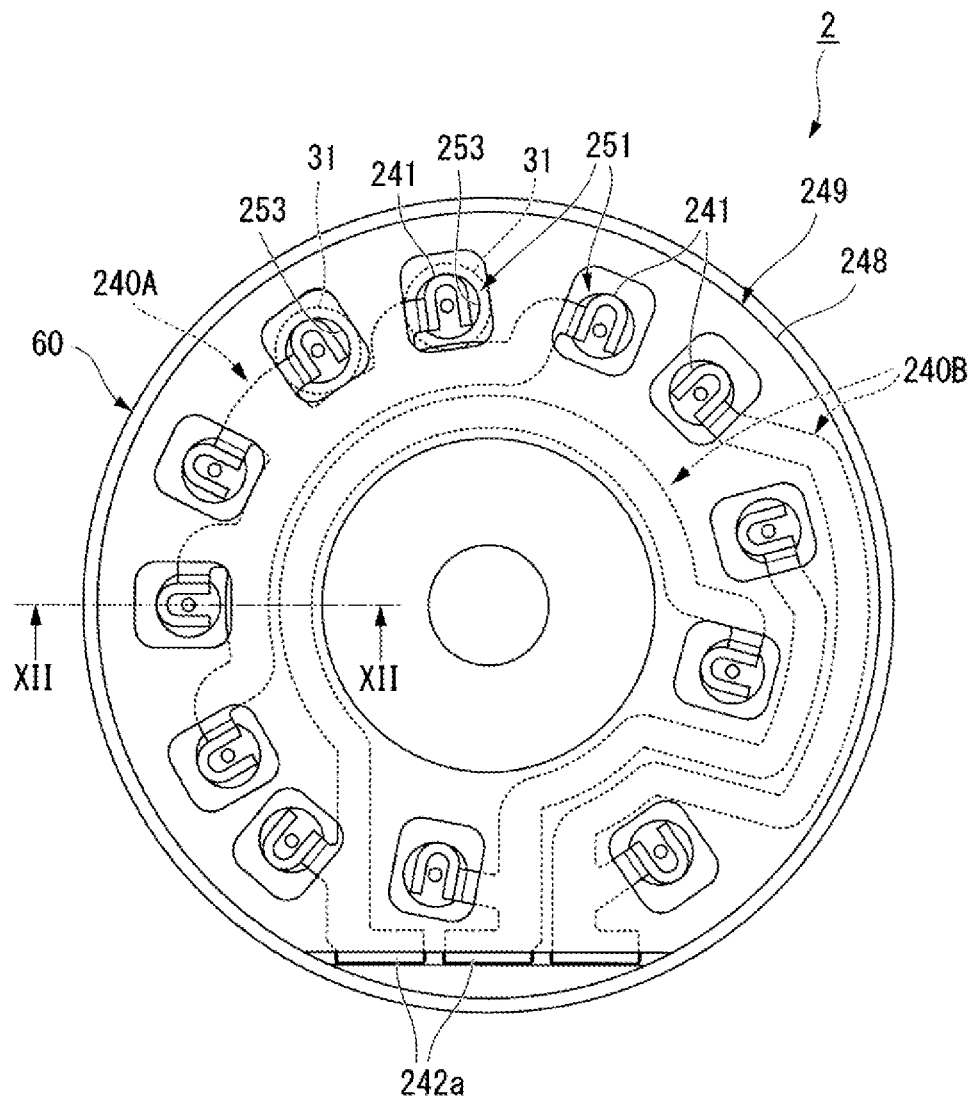
FIG. 11 is a plan view of a motor according to a sixth modification of the above embodiment of the present invention.
Figure 12:
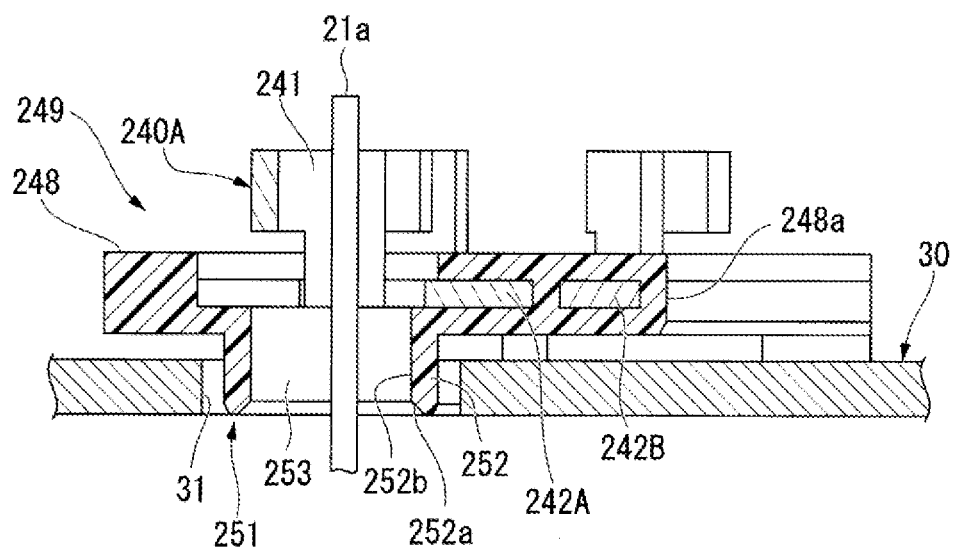
FIG. 12 is a partial cross-sectional view of the motor according to the sixth modification of the above embodiment of the present invention.

Next, a motor 2 according to a sixth modification of the above-described embodiment will now be described below. FIG. 11 is a plan view of the motor 2 according to the present modification. FIG. 12 is a cross-sectional view of a portion of the motor 2 taken along line XII-XII in FIG. 11. The motor 2 is different from the above-described motor 1 primarily in that the coil support 50 is not provided and in the structure of a busbar unit 249. Note that, in the following description of the motor 2, members or portions of the motor 2 which have their equivalents in the above-described motor 1 are denoted by the same reference numerals as those of their equivalents in the above-described motor 1, and descriptions of those members or portions are omitted.

Similarly to the above-described motor 1, the motor 2 includes a rotor 10, a stator 20, a first bearing 12, a second bearing 13, a bearing holder 30, and a housing 60 (see FIG. 2). In addition, referring to FIG. 11, the motor 2 further includes the busbar unit 249.

The busbar unit 249 is arranged above the bearing holder 30. The busbar unit 249 includes busbars (a neutral point busbar 240A and phase busbars 240B), and a busbar holder 248. That is, the motor 2 includes the busbars 240A and 240B and the busbar holder 248.

Referring to FIG. 11, the number of neutral point busbars 240A included in the busbar unit 249 is one. The neutral point busbar 240A includes a body portion 242A and a plurality of (six) connection terminals 241 each of which is arranged to extend from the body portion 242A. The neutral point busbar 240A is arranged to electrically connect coil ends 21a connected to the connection terminals 241 thereof to one another, and functions as a neutral point of a three-phase circuit having a star configuration.

The number of phase busbars 240B included in the busbar unit 249 is three. Each phase busbar 240B includes a body portion 242B and connection terminals 241. The body portion 242B of each phase busbar 240B has a different shape. The body portion 242B of each phase busbar 240B includes a connection portion 242a used for connection with an external device (not shown).

Referring to FIG. 11, each of the connection terminals 241 of the neutral point busbar 240A and the phase busbars 240B is in the shape of the letter "U" with an opening facing in one direction. Connection between each connection terminal 241 and a corresponding one of the coil ends 21a is accomplished with the coil end 21a being placed between portions of the connection terminal 241 and welded to the connection terminal 41. FIG. 11 illustrates a situation in which each connection terminal 241 and the corresponding coil end 21a have not yet been connected with each other. Note that, although only one coil end 21a is connected to each connection terminal 241 in the present modification, two or more coil ends 21a may alternatively be connected to any of the connection terminals 241.

The busbar holder 248 is made of a resin material, and the unified busbar unit 249 is defined by an insert molding process with a portion of each of the busbars 240A and 240B buried in the busbar holder 248. The busbar holder 248 is arranged to support each of the busbars 240A and 240B.

Referring to FIG. 11, the busbar holder 248 is in the shape of a disk. A hole 248a, through which a shaft 11 is arranged to pass, is defined in a center of the busbar holder 248. In addition, the busbar holder 248 includes a plurality of insulating support portions 251 arranged in the circumferential direction.

Each insulating support portion 251 includes an opening portion 253 arranged to pass therethrough in the axial direction to have a corresponding one of the coil ends 21a pass therethrough. One of the connection terminals 241 of the neutral point busbar 240A or of the phase busbars 240B is arranged over the opening portion 253, and the coil end 21a which passes through the opening portion 253 is connected to the connection terminal 241.

Referring to FIG. 12, each insulating support portion 251 includes a wall portion 252 arranged to extend in the axial direction toward the bearing holder 30 (i.e., downward) from an edge of the opening portion 253. That is, an area inside of the wall portion 252 corresponds to the opening portion 253.

The wall portion 252 is cylindrical. An inner circumferential surface of the wall portion 252 includes, at a lower end thereof, a tapered surface 252a increasing in diameter in the downward direction. Thus, a lower end portion of the opening portion 253 inside of the wall portion 252 is arranged to increase in diameter toward the stator 20 (i.e., in the downward direction). The coil end 21a is inserted into the opening portion 253 from the direction of the stator 20. Arranging the lower end portion of the opening portion 253 to increase in diameter in the downward direction makes it easier to insert the coil end 21a into the opening portion 253.

The inner circumferential surface of the wall portion 252, excluding the tapered surface 252a, includes a cylindrical surface 252b extending in the axial direction. A region surrounded by the cylindrical surface 252b corresponds to a portion of the opening portion 253 which has the smallest cross-sectional area in the opening portion 253. The portion of the opening portion 253 which has the smallest cross-sectional area in the opening portion 253 lies inside of an edge of a corresponding one of through holes 31 of the bearing holder 30 when viewed in the axial direction. This enables the coil end 21a to be supported inside of the edge of the corresponding through hole 31 of the bearing holder 30 to prevent the coil end 21a from making contact with the edge of the corresponding through hole 31.

The wall portion 252 is inserted into the corresponding through hole 31 of the bearing holder 30. The wall portion 252 is arranged between an outer circumference of the coil end 21a and a wall surface of the corresponding through hole 31 of the bearing holder 30. The wall portion 252 thus separates the coil end 21a from the wall surface of the corresponding through hole 31 to provide more secure isolation between the coil end 21a and the bearing holder 30.

In the motor 2 according to the present modification, isolation between each coil end 21a and the bearing holder 30 can be ensured as in the above-described motor 1. Moreover, positioning of each coil end 21a can be achieved to make it easier to connect the coil end 21a to a corresponding one of the connection terminals 241 as in the above-described motor 1. Furthermore, in contrast to the above-described motor 1, the motor 2 according to the present modification is able to achieve the above-described beneficial effects without including the coil support 50. Thus, the motor 2 is able to achieve a cost reduction with a reduced number of parts.

While at least an embodiment of the present invention and modifications thereof have been described above, it will be understood that features, a combination of the features, and so on according to each of the embodiment and the modifications thereof are only illustrative and not restrictive, and that an addition, elimination, and substitution of a feature(s), and other modifications can be made without departing from the scope and spirit of the present invention.

Electric Power Steering Apparatus

Figure 13:
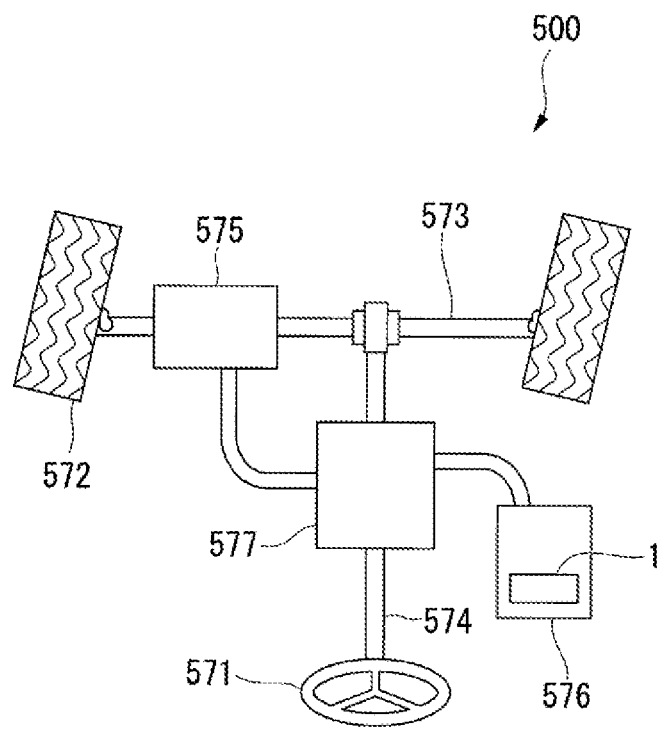
FIG. 13 is a schematic diagram of an electric power steering apparatus according to at least an embodiment of the present invention.

Next, an apparatus according to at least an embodiment of the present invention, in which the above-described motor 1 (or the above-described motor 2) is installed, will now be described below. Specifically, an electric power steering apparatus (i.e., an in-vehicle apparatus) 500 including the motor 1 according to at least an embodiment of the present invention will now be described below. FIG. 13 is a schematic diagram of the electric power steering apparatus 500 according to the present embodiment.

The electric power steering apparatus 500 is installed in a steering mechanism for wheels of an automobile. The electric power steering apparatus 500 is an apparatus designed to reduce steering effort needed to steer the automobile through oil pressure. Referring to FIG. 13, the electric power steering apparatus 500 according to the present embodiment includes the motor 1, a steering axle 574, an oil pump 576, and a control valve 577.

The steering axle 574 transmits an input from a steering wheel 571 to an axle 573 equipped with wheels 572. The oil pump 576 is arranged to generate an oil pressure in a power cylinder 575, which is arranged to transmit a driving force due to the oil pressure to the axle 573. The control valve 577 is arranged to control an oil from the oil pump 576. In the electric power steering apparatus 500, the motor 1 is installed as a driving source for the oil pump 576.

Each of the motors 1 and 2 according to the above-described embodiment and the modifications thereof is suitable for use in an in-vehicle apparatus, a typical example of which is the electric power steering apparatus 500. In the motor 1, the isolation between each coil end 21a and the bearing holder 30 is more effectively ensured by the insulating support portions 51. Thus, the isolation between each coil end 21a and the bearing holder 30 can be ensured even under an environment in which the motor 1 receives strong vibrations, such as, for example, in the in-vehicle apparatus.

Note that features of the above-described embodiment and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor comprising a shaft having a central axis extending in an axial direction as a center thereof;
a stator arranged opposite to the rotor, and comprising a plurality of coils;
a bearing arranged to support the shaft;
a metallic bearing holder arranged to cover the stator from an axial side thereof, and arranged to support the bearing;
at least one busbar arranged on an opposite axial side of the bearing holder with respect to the stator, and comprising a connection terminal connected with a coil end of a coil wire extending from a corresponding one of the coils; and
a coil support arranged between the stator and the bearing holder, and fixed to the stator; wherein
the bearing holder comprises at least one through hole arranged to pass therethrough in the axial direction to have a corresponding one of the coil ends pass therethrough;
the coil support comprises at least one insulating support portion comprising an opening portion arranged to pass therethrough in the axial direction to have a corresponding one of the coil ends pass therethrough; and
a portion of the opening portion of the at least one insulating support portion which has a smallest cross-sectional area in the opening portion lies inside of an edge of a corresponding one of the at least one through hole of the bearing holder when viewed in the axial direction.

2. The motor according to claim 1, wherein the stator comprises an insulator; and
the coil support is fixed to the insulator through snap fitting.

3. A motor comprising:
a rotor comprising a shaft having a central axis extending in an axial direction as a center thereof;
a stator arranged opposite to the rotor, and comprising a plurality of coils;
a bearing arranged to support the shaft;
a metallic bearing holder arranged to cover the stator from an axial side thereof, and arranged to support the bearing;
at least one busbar arranged on an opposite axial side of the bearing holder with respect to the stator, and comprising a connection terminal connected with a coil end of a coil wire extending from a corresponding one of the coils; and
a busbar holder arranged to support the at least one busbar; wherein
the bearing holder comprises at least one through hole arranged to pass therethrough in the axial direction to have a corresponding one of the coil ends pass therethrough;
the busbar holder comprises at least one insulating support portion comprising an opening portion arranged to pass therethrough in the axial direction to have a corresponding one of the coil ends pass therethrough; and
a portion of the opening portion of the at least one insulating support portion which has a smallest cross-sectional area in the opening portion lies inside of an edge of a corresponding one of the at least one through hole of the bearing holder when viewed in the axial direction.

4. The motor according to claim 1, wherein the opening portion of the at least one insulating support portion comprises the portion which has the smallest cross-sectional area in the opening portion on an opposite side with respect to the stator.

5. The motor according to claim 1, wherein the at least one insulating support portion comprises a wall portion arranged to extend in the axial direction toward the bearing holder from at least a portion of an edge of the opening portion.

6. The motor according to claim 5, wherein the wall portion is arranged between at least a portion of an outer circumference of the corresponding coil end and a wall surface of the corresponding through hole of the bearing holder.

7. The motor according to claim 5, wherein the wall portion is arranged to surround an outer circumference of the corresponding coil end.

8. The motor according to claim 5, wherein
the wall portion is arranged to open in one direction on a plane perpendicular to the axial direction; and
the at least one insulating support portion comprises a guide hole arranged to pass therethrough in the axial direction and extend in the one direction from the opening portion.

9. The motor according to claim 1, wherein the opening portion is arranged to extend toward the stator.

10. The motor according to claim 1, wherein two or more of the coil ends are arranged to pass through the opening portion of each of the at least one insulating support portion and a corresponding one of the at least one through hole of the bearing holder, and are connected to a corresponding one of the connection terminals of the at least one busbar.

11. The motor according to claim 10, wherein the two or more of the coil ends arranged to pass through the same opening portion are used for the same phase.

12. The motor according to claim 1, wherein
the at least one busbar comprises a body portion and the connection terminal, the connection terminal being arranged to extend radially inward from the body portion; and
from a winding start point or a winding end point of each of the coils, a portion of the corresponding coil wire is drawn in the axial direction toward a corresponding one of the connection terminals at a radially outer position on the stator.

13. The motor according to claim 1, wherein
the at least one busbar comprises a body portion and the connection terminal, the connection terminal being arranged to extend radially inward from the body portion; and
from a winding start point or a winding end point of each of the coils, a portion of the corresponding coil wire is drawn in the axial direction toward a corresponding one of the connection terminals at a radially inner position on the stator.

14. The motor according to claim 1, wherein
the at least one busbar comprises a body portion and the connection terminal, the connection terminal being arranged to extend radially outward from the body portion; and
from a winding start point or a winding end point of each of the coils, a portion of the corresponding coil wire is drawn in the axial direction toward a corresponding one of the connection terminals at a radially outer position on the stator.

15. The motor according to claim 1, wherein
the at least one busbar comprises a body portion and the connection terminal, the connection terminal being arranged to extend radially outward from the body portion; and
from a winding start point or a winding end point of each of the coils, a portion of the corresponding coil wire is drawn in the axial direction toward a corresponding one of the connection terminals at a radially inner position on the stator.

16. An in-vehicle apparatus comprising the motor of claim 1.

* * * * *